US010893575B1

(12) United States Patent
Spivey

(10) Patent No.: US 10,893,575 B1
(45) Date of Patent: Jan. 12, 2021

(54) MODULAR WIRELESS ACCESS POINT

(71) Applicant: Cisco Technology, Inc., San Jose, CA (US)

(72) Inventor: Thomas Paul Spivey, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/701,457

(22) Filed: Dec. 3, 2019

(51) Int. Cl.
   *H04W 88/08* (2009.01)
   *H01Q 1/24* (2006.01)
   *H01Q 1/22* (2006.01)
   *H04B 1/40* (2015.01)

(52) U.S. Cl.
   CPC .......... *H04W 88/08* (2013.01); *H01Q 1/2266* (2013.01); *H01Q 1/246* (2013.01); *H04B 1/40* (2013.01)

(58) Field of Classification Search
   CPC ...... H04W 88/08; H01Q 1/2266; H01Q 1/246
   See application file for complete search history.

(56) References Cited

U.S. PATENT DOCUMENTS

| 7,372,705 B1* | 5/2008 | Spivey ............... H05K 7/20445 |
| | | 174/520 |
| 9,980,017 B2* | 5/2018 | Hernandez ............. H04Q 1/155 |
| 2007/0098011 A1* | 5/2007 | Spivey .................... H04L 45/60 |
| | | 370/463 |
| 2015/0271309 A1* | 9/2015 | Ames .................... H04W 4/029 |
| | | 455/456.1 |
| 2016/0192037 A1* | 6/2016 | Hernandez .............. H04L 49/40 |
| | | 370/400 |
| 2016/0198523 A1* | 7/2016 | Wang ....................... H04B 1/38 |
| | | 455/561 |
| 2018/0026327 A1* | 1/2018 | Hendrix ................. H04Q 1/118 |
| | | 455/562.1 |
| 2019/0148819 A1* | 5/2019 | Dominguez .......... E05C 19/003 |
| | | 455/562.1 |

FOREIGN PATENT DOCUMENTS

| CN | 204652417 | 9/2015 |
| CN | 206149306 | 5/2017 |
| CN | 110224941 | 9/2019 |

* cited by examiner

*Primary Examiner* — Md K Talukder
(74) *Attorney, Agent, or Firm* — Behmke Innovation Group LLC; Kenneth J. Heywood; Jonathon P. Western

(57) ABSTRACT

In one embodiment, a wireless access point comprises a housing that defines a plurality of externally-facing apertures. The access point also comprises a radio module that is removably coupled to one of the externally-facing apertures of the housing and includes one or more antennas. The access point further comprises a motherboard module that is removably coupled to one of the externally-facing apertures of the housing and includes a motherboard that controls the one or more antennas of the radio module. The access point yet further comprises a power supply module that is removably coupled to one of the externally-facing apertures of the housing and supplies power to the motherboard and radio modules.

20 Claims, 7 Drawing Sheets

MODULAR WIRELESS ACCESS POINT

TECHNICAL FIELD

The present disclosure relates generally to computer networks, and, more particularly, to a modular wireless access point.

BACKGROUND

As wireless access points become increasingly ubiquitous, more and more access points are being deployed in outdoor settings. In many cases, the outdoor access points are placed in hard-to-reach places, such as on buildings, poles, and the like. This makes servicing these access points particularly challenging and time consuming.

To add to the challenges in servicing outdoor access points, a typical access point for outdoor use is also not designed with ease of servicing in mind. Indeed, the components of a typical outdoor access point are wired together in such a way that failure of a component requires replacement of the entire unit, as rewiring the unit is nearly impossible in the field.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
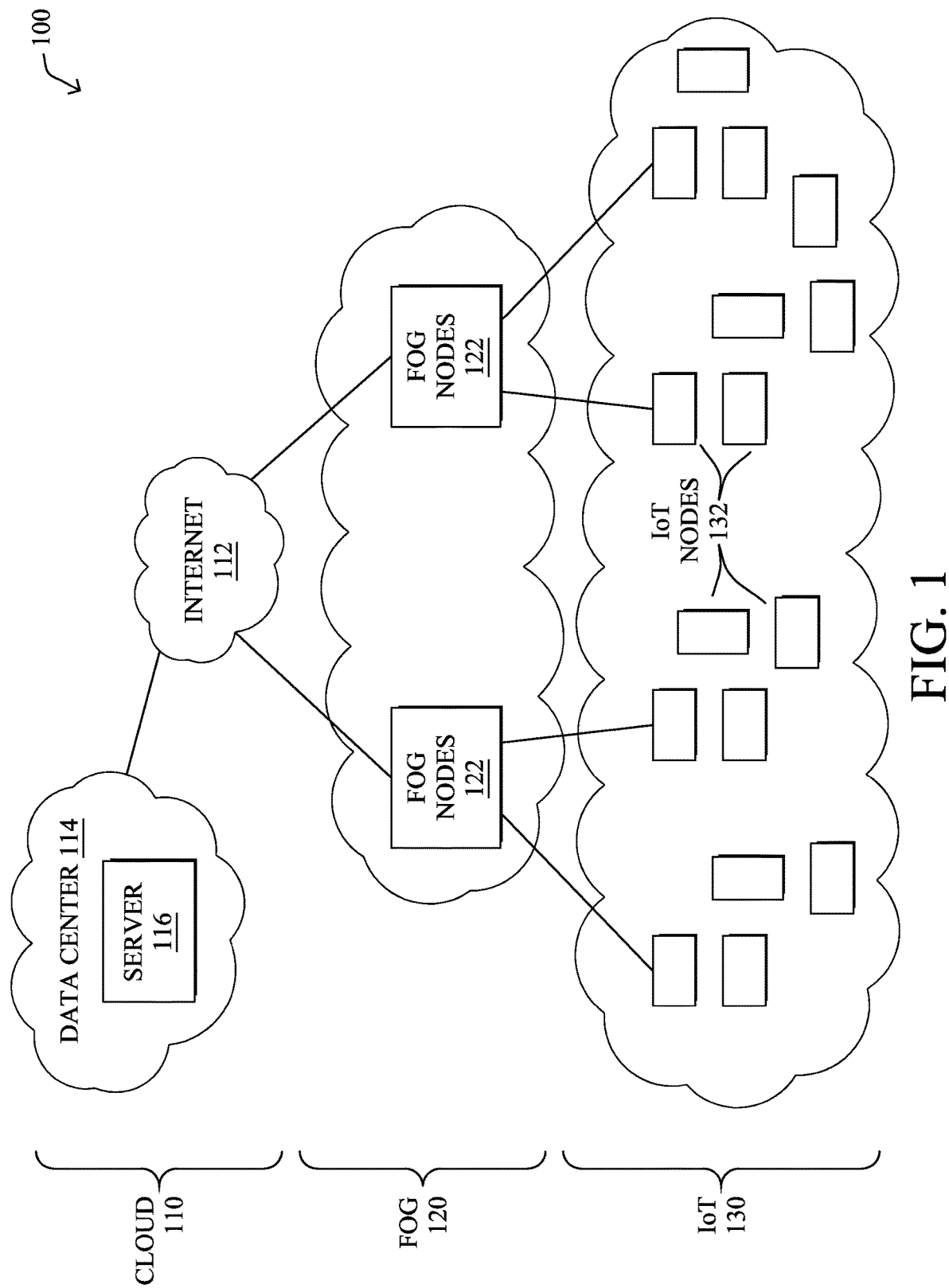
FIG. 1 illustrate an example computer network.

According to one or more embodiments of the disclosure, a wireless access point comprises a housing that defines a plurality of externally-facing apertures. The access point also comprises a radio module that is removably coupled to one of the externally-facing apertures of the housing and includes one or more antennas. The access point further comprises a motherboard module that is removably coupled to one of the externally-facing apertures of the housing and includes a motherboard that controls the one or more antennas of the radio module. The access point yet further comprises a power supply module that is removably coupled to one of the externally-facing apertures of the housing and supplies power to the motherboard and radio modules.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
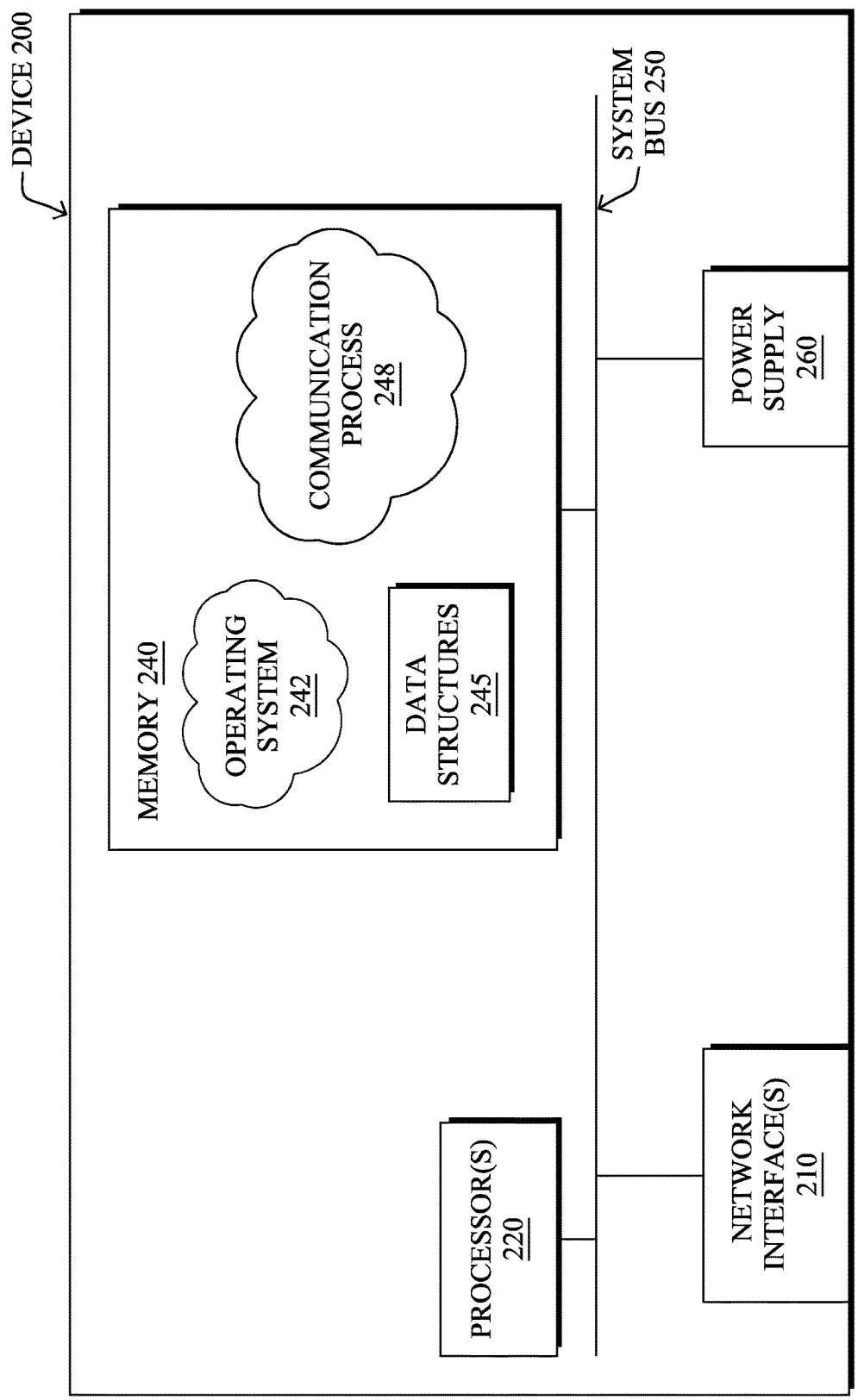
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative communication process 248, as described herein. Note that while process 248 is shown in centralized memory 240 alternative embodiments provide for the process to be specifically operated within the network interface(s) 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
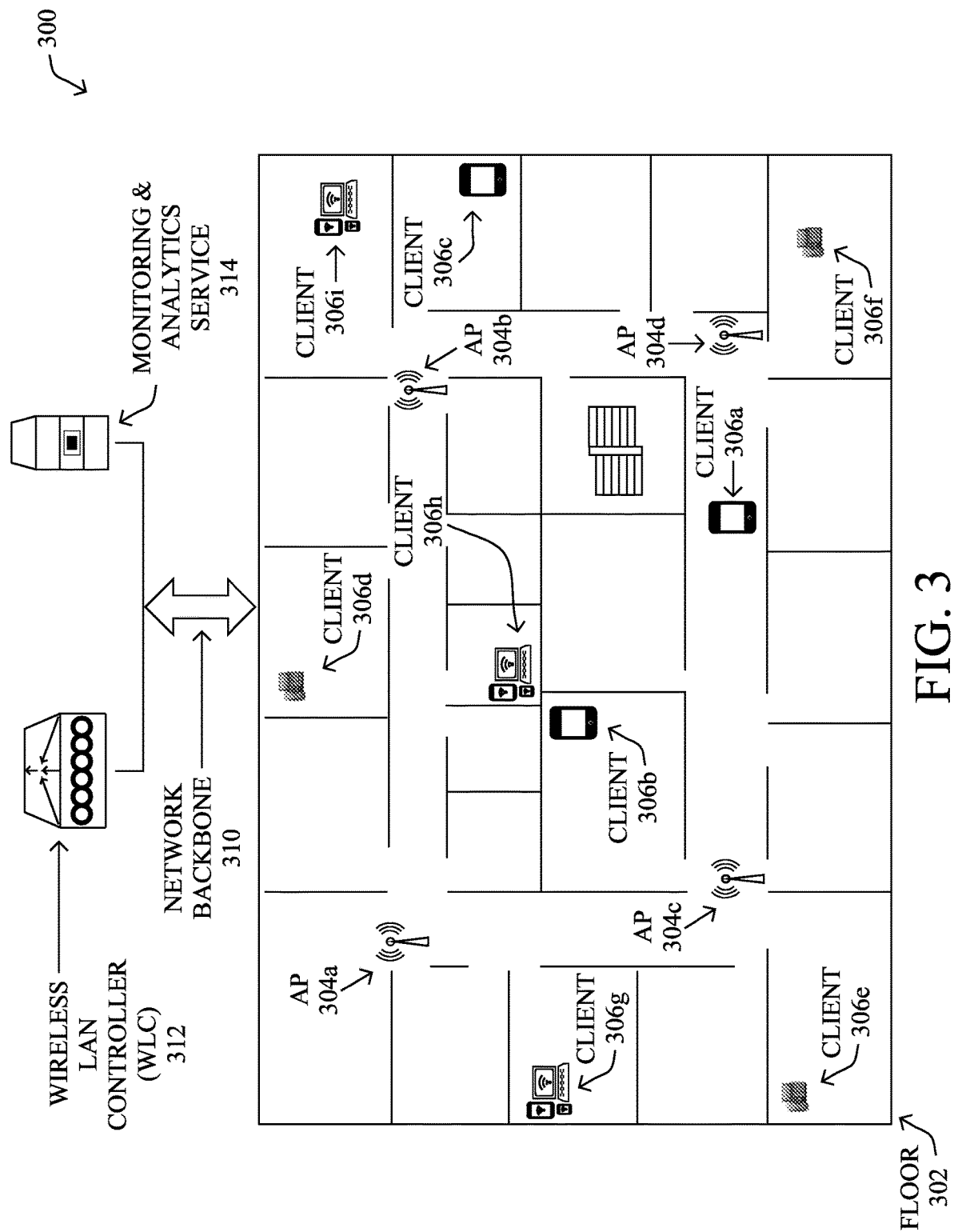
FIG. 3 illustrates an example wireless network.

FIG. 3 illustrates an example wireless network 300, according to various embodiments. Wireless network 300 may be deployed to a physical location, such as floor 302 shown, and may include various infrastructure devices. These infrastructure devices may include, for example, one or more access points (APs) 304 that provide wireless connectivity to the various wireless clients 306 distributed throughout the location. For illustrative purposes, APs 304a-304d and clients 306a-306i are depicted in FIG. 3. However, as would be appreciated, a wireless network deployment may include any number of APs and clients.

A network backbone 310 may interconnect APs 304 and provide a connection between APs 304 and any number of supervisory devices or services that provide control over APs 304. For example, as shown, a wireless LAN controller (WLC) 312 may control some or all of APs 304a-404d, by setting their control parameters (e.g., max number of attached clients, channels used, wireless modes, etc.). Another supervisory service that oversees wireless network 300 may be a monitoring and analytics service 314 that measures and monitors the performance of wireless network 300 and, if so configured, may also adjust the operation of wireless network 300 based on the monitored performance (e.g., via WLC 312, etc.). In further embodiments, as detailed below, monitoring and analytics service 314 may also be configured to perform object modeling from a motion and/or kinematics standpoint for purposes such as object detection/identification, object tracking, object behavioral predictions, alerting, and the like. Note that service 314 may be implemented directly on WLC 312 or may operate in conjunction therewith, in various implementations.

Network backbone 310 may further provide connectivity between the infrastructure of the local network and a larger network, such as the Internet, a Multiprotocol Label Switching (MPLS) network, or the like. Accordingly, WLC 312 and/or monitoring and analytics service 314 may be located on the same local network as APs 304 or, alternatively, may be located remotely, such as in a remote datacenter, in the cloud, etc. To provide such connectivity, network backbone 310 may include any number of wired connections (e.g., Ethernet, optical, etc.) and/or wireless connections (e.g., cellular, etc.), as well as any number of networking devices (e.g., routers, switches, etc.).

The types and configurations of clients 306 in network 300 can vary greatly, ranging from powerful computing devices to any number of different types of IoT nodes/devices. For example, clients 306a-306i may include, but are not limited to, wireless sensors, actuators, thermostats, relays, wearable electronics, and the like.

As noted above, various challenges arise when deploying an IoT/wireless network, such as network 300, in an outdoor setting. First, any outdoor APs 304 must be suitably configured to withstand the elements. Second, many outdoor APs 304 are often located in hard-to reach places, such as on poles or buildings, making upgrades and repairs much more difficult than in many indoor deployments. Third, traditional outdoor APs 304 are also of a fixed configuration, meaning that the entire unit needs to be removed and replaced, which can take on the order of hours to perform.

Modular Wireless Access Point

The techniques herein introduce a modular wireless access point (AP)/router that is well-suited for outdoor deployments. In some aspects, the various components of the AP are modular in nature and accessible directly from the exterior of the AP. This allows the AP to be serviced in a quick and efficient manner. In addition, the modular nature of the AP allows for its components to be easily replaced, such as during repairs and upgrades.

Specifically, according to various embodiments, a wireless access point comprises a housing that defines a plurality of externally-facing apertures. The access point also comprises a radio module that is removably coupled to one of the externally-facing apertures of the housing and includes one or more antennas. The access point further comprises a motherboard module that is removably coupled to one of the externally-facing apertures of the housing and includes a motherboard that controls the one or more antennas of the radio module. The access point yet further comprises a power supply module that is removably coupled to one of the externally-facing apertures of the housing and supplies power to the motherboard and radio modules.

Figure 4A:
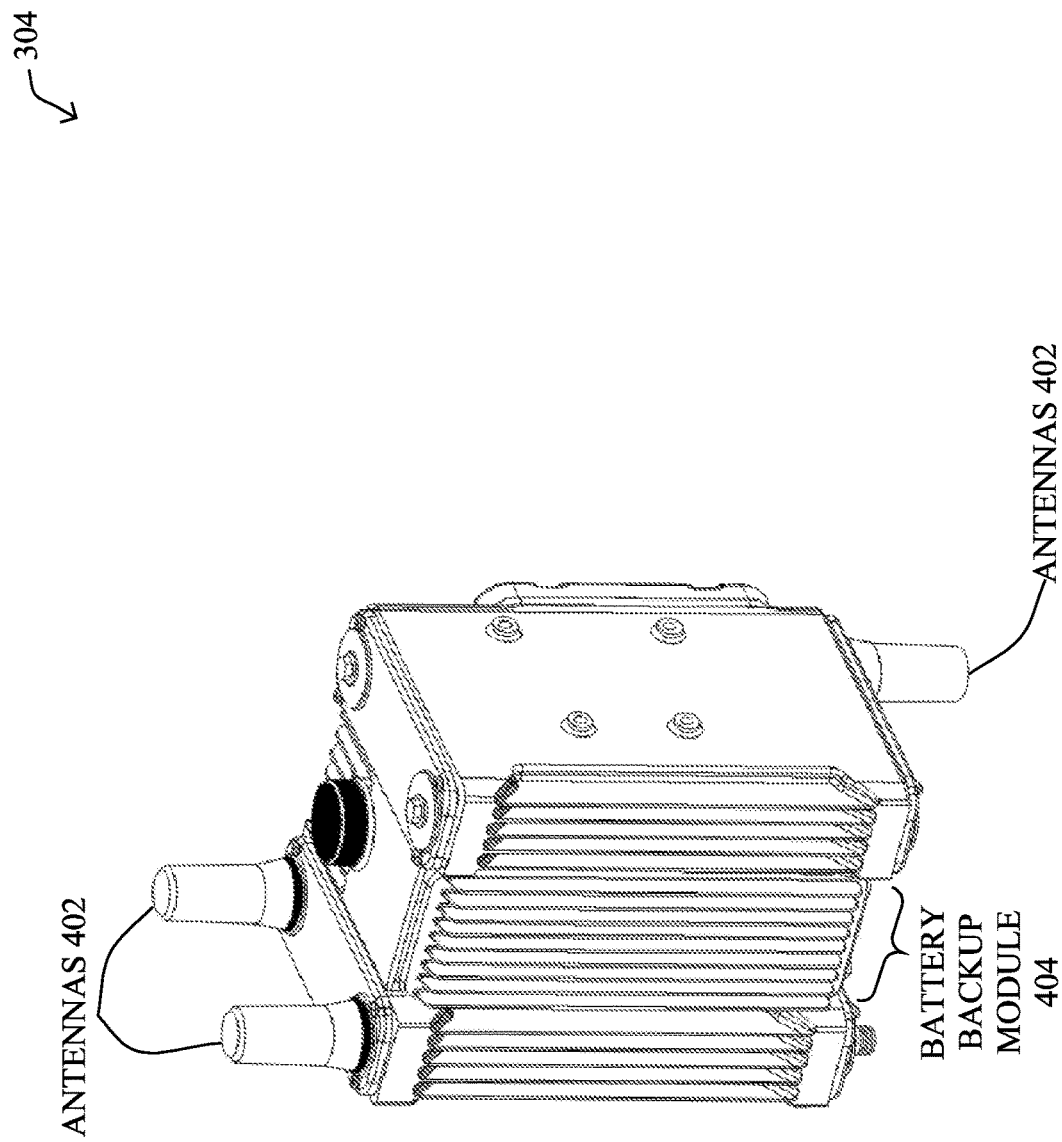
FIGS. 4A-4C illustrate various views of an example, modular wireless access point.
Figure 4B:
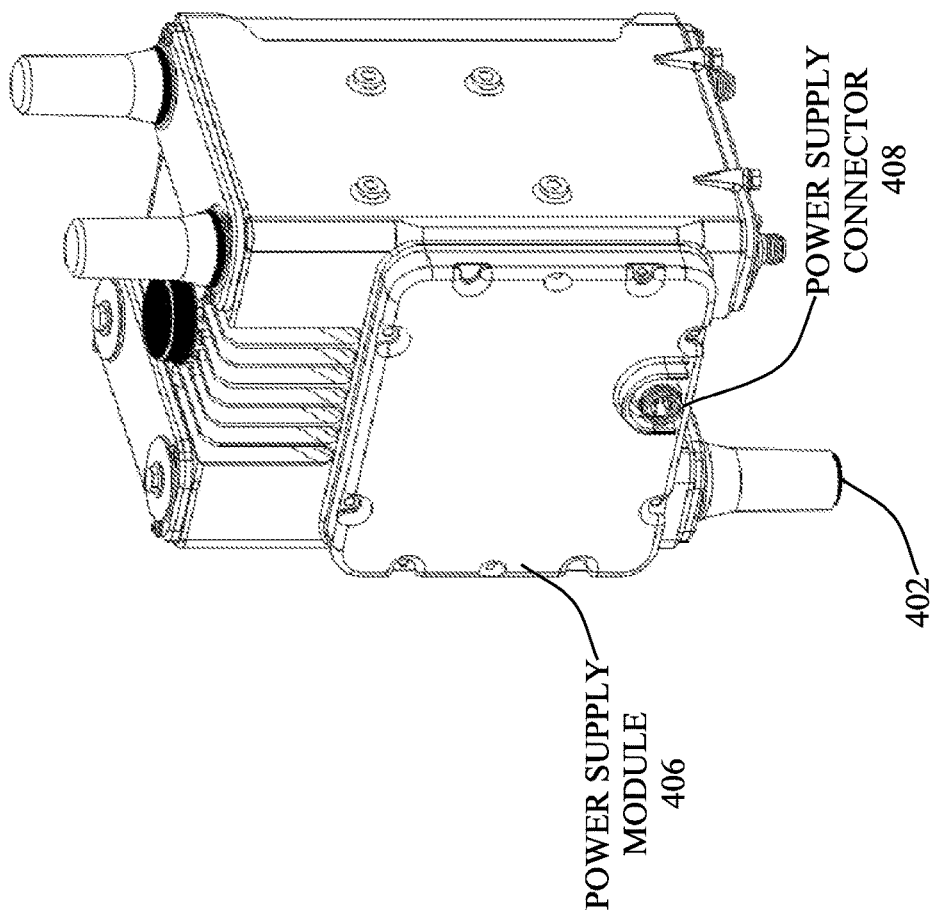
Figure 4C:
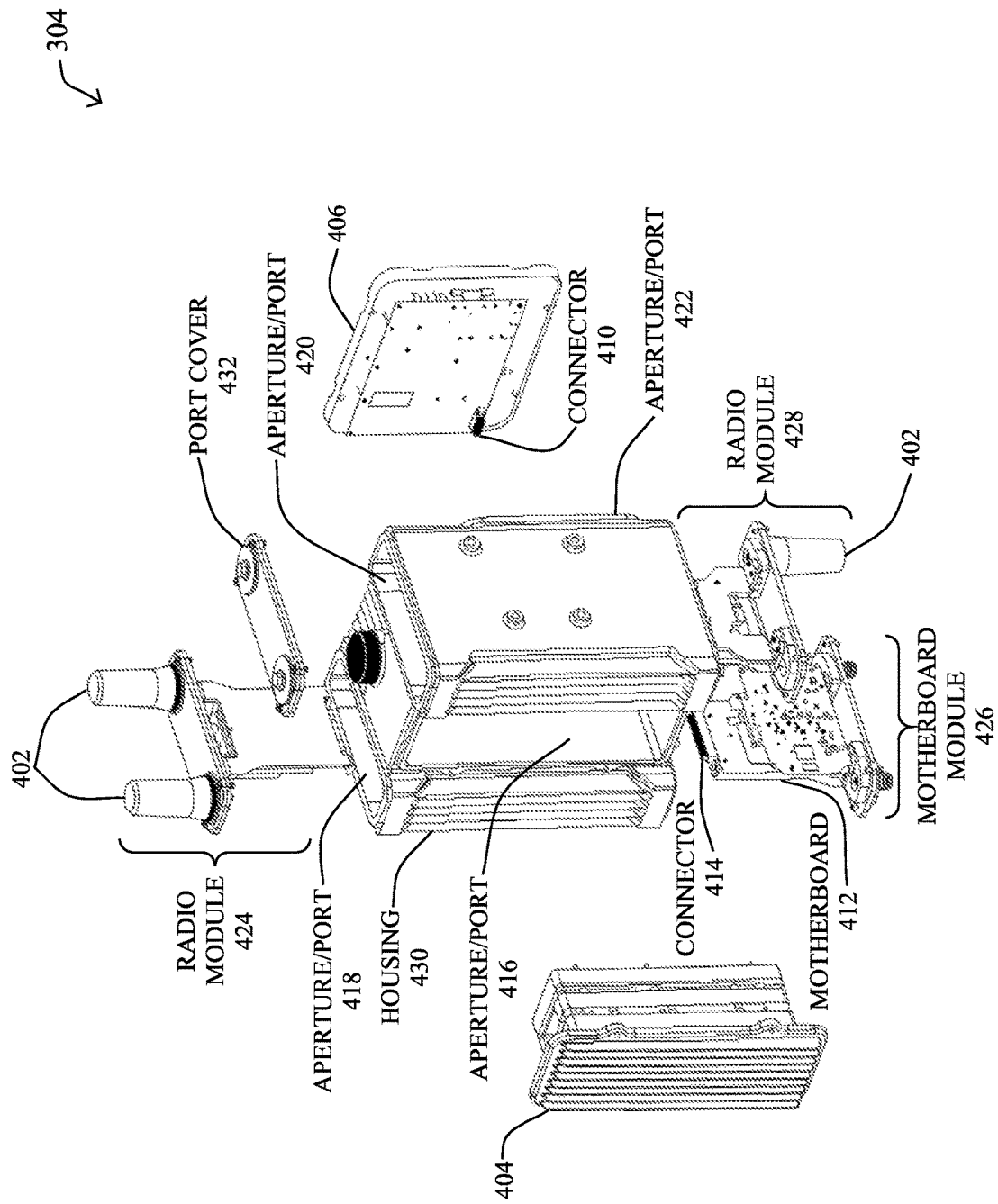

Operationally, in various embodiments, FIGS. 4A-4C illustrate an example wireless access point (AP) 304, according to various embodiments. FIG. 4A illustrates a front view of wireless AP 304, when assembled. As shown, AP 304 may include any number of antennas 402 used by AP 304 to provide network connectivity to its associated clients 306. While AP 304 is typically powered via a hardwired power line, AP 304 may also include a battery backup module 404 configured to power AP 304 when the power supply line of AP 304 loses power.

FIG. 4B illustrates a rear view of AP 304, when assembled. As shown, AP 304 may also include a power supply module 406 that supplies power to AP 304 during use. More specifically, power supply module 406 may include a power supply connector 408 that couples to a power supply line, to receive power from an external source. In turn, power supply module 406 may transform the voltage that it receives via power supply connector 408 into a voltage usable by the various components of AP 304, such as antennas 402.

FIG. 4C illustrates an exploded view of AP 304, according to various embodiments. At the core of AP 304 is a housing 430 that defines a plurality of externally-facing apertures/ports. For example, as shown, housing 430 may define a front aperture/port 416 and a rear aperture 422 that opposes port 416. Similarly, housing 430 may define any number of top and/or bottom apertures. For example, housing 430 may define top apertures/ports 418 and 420, as well as bottom apertures/ports opposite that of top apertures/ports 418-420 (not shown).

According to various embodiments, the various components of AP 304 may be modular in nature and couple to a corresponding aperture/port of AP 304. Thus, the various components of AP 304 may be fully serviceable from the outside and there is no need for AP 304 to include any access doors or panels. In addition, each module may include one or more connectors that mate to a corresponding connector within AP 304, also eliminating the need for a wiring harness within AP 304.

In the embodiment shown, AP 304 may include any or all of the following modules:

Power supply module 406—this module, as described above, is responsible for supplying power to AP 304, and may couple to aperture/port 422. Power supply module 406 may also include a connector 410 that couples with a corresponding connector within housing 430 to supply power to AP 304.

Battery backup module 404—this module may couple with aperture/port 416 and supply power to AP 304 when power supply module 406 cannot. In other words, battery backup module 404 may include a battery that is utilized by AP 304 when it detects that power is no longer being supplied by power supply module 406. For example, if the power supply line feeding power supply module 406 fails to supply sufficient power, or if power supply module 406 itself fails, AP 304 may begin using battery backup module 404 as its power source.

Radio module 424—this module may couple to aperture/port 418 and include one or more antennas 402 that are powered by power supply module 406 and/or battery backup module 404. Radio module 424 may also include the various circuitry typical to a transceiver, such as various filters, switches, amplifiers, an analog-to-digital (A2D) converter, a digital-to-analog (D2A) converter, an oscillator or other signal reference, a synthesizer, a baseband generator, a decoder, or any other transceiver component typical to a wireless transceiver.

Radio module 428—this module may couple to a its own corresponding aperture/port of housing 430 (not shown) and operate in a similar manner as that of radio module 424, either on the same or different wavelengths. For example, radio module 424 may operate in the 5 GHz band, while radio module 428 may operate in the 2.4 GHz band, etc. Accordingly, radio module 428 may also include transceiver circuitry to control the operation of its antenna 402.

Motherboard module 426—this module may include the primary processing components of AP 304, such as motherboard 412 (e.g., a CPU, memory, a wired network interface, etc.), that provides control over the other circuitry of AP 304. For example, during use, motherboard 412 may control the various switches of battery backup module 404, power supply module 406, radio module 424, and radio module 428 (e.g., to power the transceiver circuitry). In other words, motherboard 412 may control the various functions of AP 304, such as receiving and processing wireless signals from clients 306, sending packets wirelessly to clients 306, relaying received packets between a hardwired network connection and the wireless clients, etc. In some cases, motherboard 412 may also provide routing functionality to AP 304, in addition to simply acting as an access point.

As would be appreciated, housing 430 may include any number of apertures/ports, allowing the technician to configure AP 304 as desired. For example, while AP 304 is shown with two separate radio modules 424 and 428, the modular nature of AP 304 also allows for the use of a single radio module, as well. Similarly, as shown, aperture/port 420 is empty, presenting the technician with the further option of installing a third radio module, as well.

When fewer modules are installed in AP 304 than the number of externally-facing apertures of housing 430, a corresponding port cover may be coupled to that aperture, to prevent moisture from entering housing 430. For example, to cover the unused aperture/port 420, a corresponding port cover 432 may be removably coupled to aperture 420.

Coupling of a given module or port cover to a particular aperture/port of housing 430 can be achieved in a number of ways, so long as it is done in a removable/reversible fashion. Preferably, each installed module may be coupled to its corresponding aperture/port via a plurality of removable fasteners, such as bolts, that extend through the module and into housing 430. However, other reversible fastening means can also be used, in further embodiments. For example, each module may be removably coupled to its corresponding aperture/port via a plurality of tabs, through the use of magnets, or the like.

To protect the internals of AP 304 from the elements, each coupling of a module to an aperture/port of housing 430 may also include an environmental seal that becomes sandwiched between the module and its aperture, when installed. In various embodiments, such a seal may be integral to the aperture/port itself, the module, or may be removably installed in conjunction with the module. For example, the environmental seal may take the form of a rubber or silicone gasket that provides at least some degree of waterproofing to AP 304 (e.g., AP 304 may be submersible up to a certain depth or time).

Each module may also have one or more connectors that mate with a corresponding connector internal to housing 430. In other words, housing 430 may further comprise wiring and/or circuitry configured to electronically connect the various modules of AP 304. For example, power supply module 406 may include connector 410 that mates with a corresponding connector internal to aperture/port 422, motherboard module 426 may include a connector 414 on the end of motherboard 412 that mates with a corresponding connector internal to its aperture/port, etc.

Figure 5:
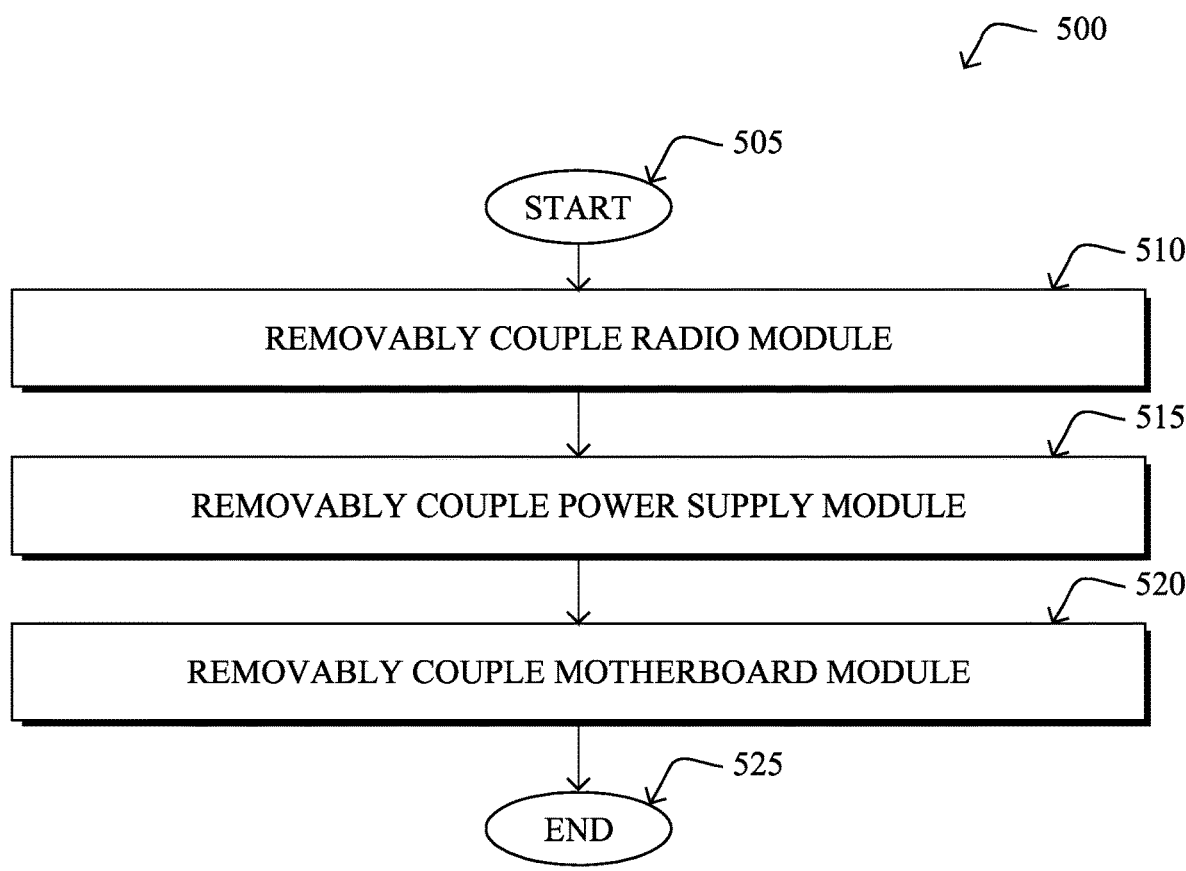
FIG. 5 illustrates an example simplified procedure for operating a module wireless access point.

FIG. 5 illustrates an example simplified procedure for operating a modular access point, in accordance with one or more embodiments described herein. The procedure 500 may start at step 505, and continues to step 510, where, as described in greater detail above, a radio module may be removably coupled to an externally-facing aperture of a housing of the access point. In various embodiments, the radio module may include one or more antennas and may be coupled to the aperture through the use of bolts or other removable fasteners, tabs, magnets, or the like.

At step 515, as detailed above, a power supply module may also be removably coupled to an externally-facing aperture of the housing of the access point. In various embodiments, the power supply module may include a connector that mates with a connector internal to the housing, allowing the power supply module to provide power to the access point.

At step 520, a motherboard module may also be removably coupled to an externally-facing aperture of the housing of the access point. During use, a motherboard on the motherboard module may control the operation of the access point, such as communicating with wireless clients, relaying packets between the wireless clients and a network, etc. Procedure 500 then end at step 525.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a modular wireless access point that significantly reduces the resources required to repair, upgrade, or reconfigure the access point. In some aspects, the access point may include modular components such as a modular power supply, motherboard, antenna circuitry, battery backup, or the like, that are directly accessible from the outside of the access point, simplifying the tasks performed by a technician on the access point.

While there have been shown and described illustrative embodiments for a modular wireless access point, it is to be understood that various other adaptations and modifications may be made within the intent and scope of the embodiments herein. For example, while a certain number of externally-facing apertures/ports are shown, a modular access point in accordance with the techniques herein may have any number of apertures/ports. Further, a modular access point in accordance with the teachings herein may include any number of antennas and/or radio modules, as desired.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A wireless access point comprising:
a housing that defines a plurality of externally-facing apertures;
a radio module that is removably coupled to one of the externally-facing apertures of the housing and includes one or more antennas;
a motherboard module that is removably coupled to one of the externally-facing apertures of the housing and includes a motherboard that controls the one or more antennas of the radio module; and
a power supply module that is removably coupled to one of the externally-facing apertures of the housing and supplies power to the motherboard and radio modules, wherein each of the radio module, the motherboard module, and the power supply module is removably coupled to one of the externally-facing apertures of the housing such that at least a portion of each of the radio module, the motherboard module, and the power supply module is exposed to an outside of the housing.

2. The wireless access point as in claim 1, further comprising:
a battery backup unit module that is removably coupled to one of the externally-facing apertures of the housing and includes a battery that supplies backup power to the motherboard and radio modules when the power supply module loses power.

3. The wireless access point as in claim 1, further comprising:
a second radio module that is removably coupled to one of the externally-facing apertures of the housing and includes one or more antennas.

4. The wireless access point as in claim 1, wherein the motherboard comprises a connector that couples to a corresponding connector when the motherboard module is inserted into its corresponding externally-facing aperture of the housing.

5. The wireless access point as in claim 1, further comprising:
environmental seals located between the antenna, motherboard, and power supply modules and their respective apertures.

6. The wireless access point as in claim 1, wherein the modules are coupled to their respective apertures via removable bolts.

7. The wireless access point as in claim 1, further comprising:
a cover removably coupled to one of the externally-facing apertures of the housing.

8. The wireless access point as in claim 1, wherein the antenna, motherboard, and power supply modules are coupled to the housing without the use of a wiring harness.

9. The wireless access point as in claim 1, wherein the housing lacks an access door or panel.

10. The wireless access point as in claim 1, wherein the wireless access point is a router.

11. The wireless access point as in claim 1, wherein two of the externally-facing apertures of the housing are located at opposing sides of the housing.

12. The wireless access point as in claim 1, wherein one side of the housing defines at least two of the externally-facing apertures.

13. The wireless access point as in claim 1, wherein the housing defines four or more of the externally-facing apertures.

14. A method comprising:
removably coupling a radio module having one or more antennas to an externally-facing aperture of a housing of a wireless access point, wherein the housing defines a plurality of externally-facing apertures;
removably coupling a power supply module to one of the externally-facing apertures of the housing of the wireless access point; and
removably coupling a motherboard module to one of the externally-facing apertures of the housing of the wireless access point,
wherein each of the radio module, the motherboard module, and the power supply module is removably coupled to one of the externally-facing apertures of the housing such that at least a portion of each of the radio module, the motherboard module, and the power supply module is exposed to an outside of the housing.

15. The method as in claim 14, further comprising:
removably coupling a second radio module to one of the externally-facing apertures of the housing of the wireless access point.

16. The method as in claim 14, wherein the modules are removably coupled to the apertures of the housing using bolts.

17. The method as in claim 14, further comprising:
removably coupling a battery backup to one of the externally-facing apertures of the housing of the wireless access point.

18. The method as in claim 14, further comprising:
replacing at least one of: the antenna, power supply, or motherboard module of the wireless access point.

19. The method as in claim 14, further comprising:
associating one or more wireless clients with the wireless access point.

20. The method as in claim 14, mating connectors of the antenna, power supply, and motherboard modules to corresponding connectors internal to the housing, to electronically connect the modules.

\* \* \* \* \*